(12) United States Patent
Dippl et al.

(10) Patent No.: US 7,144,158 B2
(45) Date of Patent: Dec. 5, 2006

(54) X-RAY DETECTOR DRAWER

(75) Inventors: Thomas Dippl, Pressath (DE); Peter Rauh, Schnabelwaid (DE); Claus-Günter Schliermann, Kemnath (DE); Dieter Wöhrl, Kemnath (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/997,015

(22) Filed: Nov. 24, 2004

(65) Prior Publication Data

US 2005/0117709 A1     Jun. 2, 2005

Related U.S. Application Data

(60) Provisional application No. 60/525,707, filed on Nov. 28, 2003.

(30) Foreign Application Priority Data

Nov. 28, 2003   (DE)   ................... 103 56 286

(51) Int. Cl.
*G03B 42/02*   (2006.01)

(52) U.S. Cl. .................. 378/177; 378/167; 378/181; 378/189

(58) Field of Classification Search ............... 378/177, 378/167, 181, 189
See application file for complete search history.

(56) References Cited

U.S. PATENT DOCUMENTS

| | | | |
|---|---|---|---|
| 2,716,046 A * | 8/1955 | Minturn | 312/286 |
| 3,968,374 A | 7/1976 | Schroeder | |
| 4,416,020 A * | 11/1983 | Wagner et al. | 378/181 |
| 4,559,641 A | 12/1985 | Caugant et al. | |

FOREIGN PATENT DOCUMENTS

| | | |
|---|---|---|
| DE | 3034282 A1 | 9/1980 |
| EP | 0 218 594 B1 | 12/1989 |
| WO | WO 01/33921 A1 | 5/2001 |

OTHER PUBLICATIONS

Siemens, UROSKOP® D "A class of its own in urology" 1996.
German Office Action on DE 103 56 286.9-54.
English translation of German Office Action on DE 103 56 286.9-54.

* cited by examiner

*Primary Examiner*—Edward J. Glick
*Assistant Examiner*—John Corbett
(74) *Attorney, Agent, or Firm*—Brinks, Hofer, Gilson & Lione

(57) ABSTRACT

A detector drawer is provided in which an X-ray detector can be placed, and so as to be inserted from both sides of an examination table into a detector drawer receptacle that is open on both sides. The detector drawer has a stop actuator, which as a function of the insertion of an X-ray detector can be put into an actuation position that enables the actuation of a stop of the detector drawer receptacle and as a function of the removal of the X-ray detector into a position of repose that minimizes the actuation of the stop. A detector drawer receptacle is also provided, which is open on both sides and into which a detector drawer can be inserted from both sides of the receptacle. The receptacle has a stop which is actuatable by a stop actuator of the detector drawer as a function of an insertion of the detector drawer. The stop may include a sliding stop, which is actuatable by the stop actuator in a thrust position that is dependent on the direction of insertion of the detector drawer. The sliding stop may be supported displaceably in the thrust direction of the detector drawer receptacle.

18 Claims, 3 Drawing Sheets

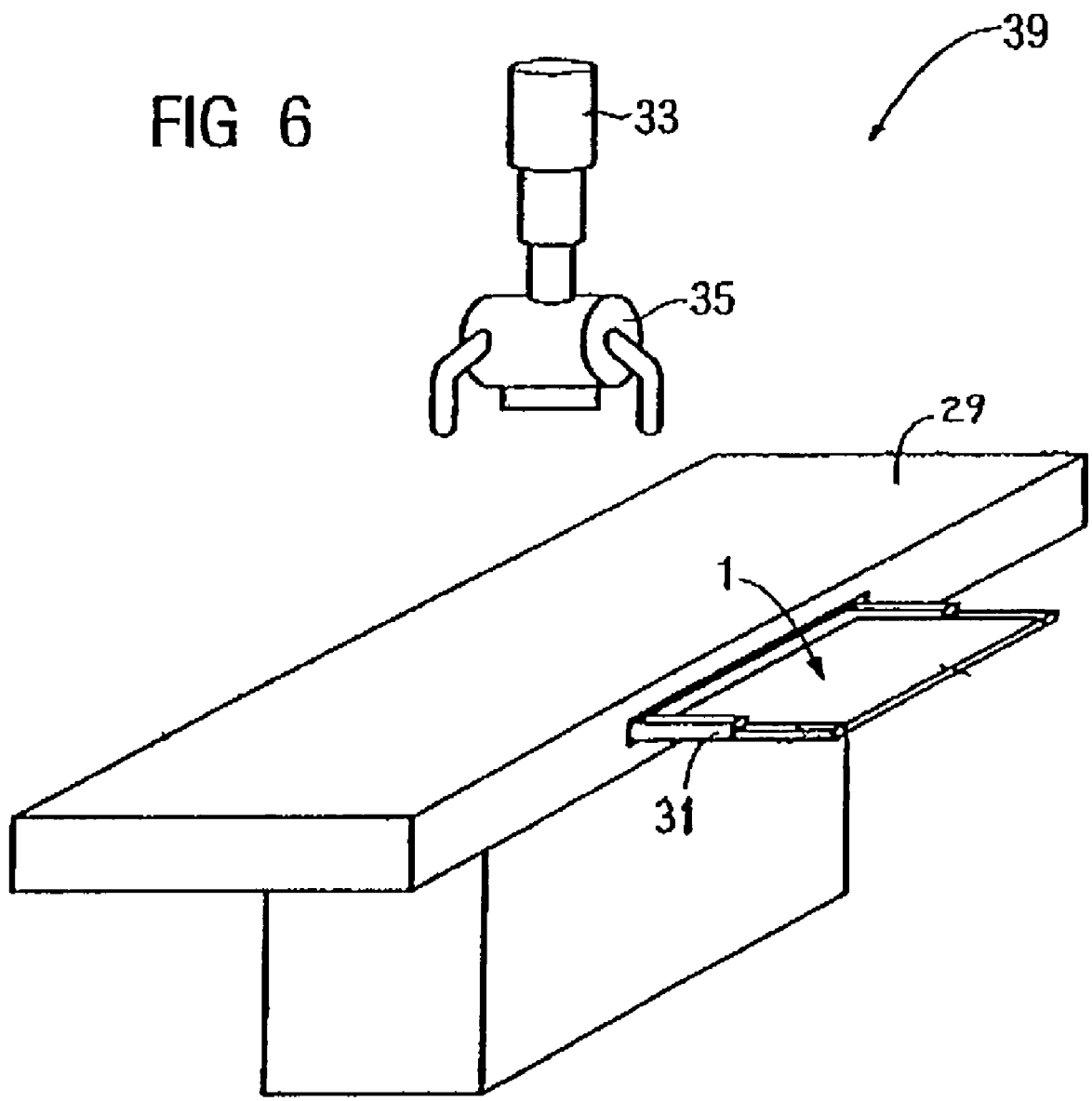

X-RAY DETECTOR DRAWER

REFERENCE TO RELATED APPLICATIONS

The present patent document claims the benefit of the filing date under 35 U.S.C. §119(e) of provisional U.S. patent application Ser. No. 60/525,707, filed Nov. 28, 2003, which is hereby incorporated by reference.

BACKGROUND

The invention relates, generally, to X-ray detectors, and more particularly, to a detector drawer for an X-ray detector and receptacle for the detector drawer. The detector drawer has a stop actuator by which a stop for limiting an insertion motion of the drawer can be actuated, and the receptacle has a stop which can limit an insertion motion of the drawer by means of a stop actuator.

Detector drawers for inserting X-ray detectors are used in X-ray examination equipment, or X-ray systems for short. X-ray systems have an X-ray source for generating X-rays that pass through a body to be examined radiologically and are then detected by an X-ray detector. The X-ray detector, either a conventional sheet film system or a digital detector, is for that purpose positioned in the X-ray beam generated by the X-ray source. The positioning is done via a detector drawer into which the X-ray detector is placed and which is inserted, with the detector in place, into a receptacle of the X-ray system.

In Bucky systems, for example, the patient to be examined lies on a patient examination or supporting table and X-rays originating from an X-ray source disposed above the table pass through him. The receptacle for the detector drawer can be pulled out like a drawer so that the X-ray detector can be placed in it and is then pushed in again. The X-ray detector is thus positioned underneath the patient.

Currently available Bucky systems are usually designed for analog X-ray detectors on the basis of sheet film systems, since digital X-ray detectors have only been available quite recently. From International Patent Disclosure WO 01/33921, it is known to convert a Bucky system designed for analog detectors into a digital system by inserting a digital X-ray detector into the receptacle of the patient examination table instead of the analog X-ray film cassette. As such, the detector is installed in an adaptively configured detector drawer. Both the detector drawer and the X-ray detector are adaptively designed and configured to one another. To make different picture-taking formats possible, such as landscape and portrait, the detector can be rotated in the detector drawer.

Desirably, one may want to use a commercially available portable digital X-ray detector that does not have to be a priori adapted to the detector receptacle. Such detectors have an electric cable connection for supplying power and for transmitting the detector signals. The electrical cable is to be taken into account when the detector is inserted into the detector drawer; the cable may not become kinked nor sheared off. The electrical cable may therefore extend in general in such a way as to extend out of the receptacle opening in the patient examination table. From there, the electrical cable may lead to a control unit for the X-ray system. Such trailing cable may present a potential risk of stumbling and be a hindrance to medical personnel walking up to or moving around the patient examination table. Depending on the intended examination, however, the capability of approaching the patient from all sides may be an unavoidable necessity.

In order to reach the patient from either side of the patient examination table to suit a given situation, without problems in manipulating the detector drawer, a patient examination table with a receptacle open on two sides for the drawer is known from the X-ray system known as Uroskop D, made by Siemens AG. A system with a receptacle open on two sides is also disclosed in German Patent Disclosure DE 30 34 282. A detector drawer can be inserted from both open sides of the receptacle. If a portable digital X-ray detector is used, the receptacle open on two sides and corresponding sides of the examination table could be used in such a way that the detector is inserted from one side of the examination table from which medical personnel do not need to approach the patient. One can thus be assured that the cable does not have to be in the way of the medical personnel.

However, in the receptacles that are open on both sides as described, there may potentially be a risk that the detector drawer will be pushed unintentionally from one side through to the other even though a detector is located in it. While this arrangement may be unproblematic for an analog detector without a cable, in a digital detector with a cable extended out of the receptacle, and in particular a portable detector, there is the risk that the cable may be subjected to severe tensile stress as the drawer is pushed through or may become damaged or be sheared off inside the receptacle and hence suffer or incur damage. Avoiding such damage is thus dependent on the care and attention paid by the person or user operating the X-ray system. This configuration may require concentration from the medical personnel, and in particular, may distract the medical professional from the actual task at hand.

OBJECT AND SUMMARY

The present invention is defined by the following claims. This description summarizes some aspects of the present embodiments and should not be used to limit the claims.

One object is to create a receptacle for a detector drawer as well as a detector drawer by which the risk of unintended pushing the drawer through the receptacle, despite a detector located in it, is avoided or minimized.

One concept is to disclose a detector drawer into which an X-ray detector can be placed and which is configured to be inserted from both sides of the examination table into a detector drawer receptacle that is open on both sides and which has a stop actuator. The stop actuator as a function of the insertion of an X-ray detector can be put into an actuation position that enables the actuation of a stop of the detector drawer receptacle and as a function of the removal of the X-ray detector into a position of repose or rest that prevents the actuation of the stop. As such, one advantage may be that the stop actuator becomes operative only when an X-ray detector has been put in place. Hence, on one hand, the detector drawer with the detector in place can be prevented from sliding through by a stop present in the receptacle. On the other hand, the drawer without a detector, that is, when the stop actuator is in the non-operative position of repose, can be thrust through to the other side of the receptacle without being stopped by the stop. Desirably when portable X-ray detectors are used, this arrangement may avert the risk of exposing the cable of an inserted detector to tensile stress or shearing if the drawer is unintentionally pushed through. Further, because this arrangement may still allow for the empty drawer to be pushed through, the detector can be placed in the drawer from both open sides of the receptacle.

In an advantageous feature of the detector drawer, the stop actuator has a slide, which can be displaced in one direction as a function of the insertion of the X-ray detector and in the opposite direction as a function of the removal of the X-ray detector. Such slide, which can be thrust downward upon insertion of the detector, for instance by its own weight, is a simple embodiment of the stop actuator. The actuation position and the position of repose of the stop actuator are adjusted by a motion of the slide that is in turn affected by the insertion and removal of the detector, without complicated mechanical conversion.

In a further advantageous feature of the detector drawer, the stop actuator includes a spring element, by whose spring force the slide is displaceable as a function of a removal of the X-ray detector. Such a spring element represents a simple mechanical way of putting the slide in the position of repose.

A further basic concept is to disclose a detector drawer receptacle, which is open on both sides and into which a detector drawer can be inserted from either side. The detector drawer receptacle has a stop which is actuatable by a stop actuator of the detector drawer as a function of an insertion of the detector drawer. As such, an advantageous feature is that despite being open on both sides, the receptacle has a capability of preventing a detector drawer from being pushed through. Thus, for a receptacle which is open on two sides and is configured to enable the drawer to be pushed through, an arrangement can be configured for minimizing the potential of the detector drawer of being pushed through, with a consideration of the use of portable X-ray detectors whose cables could become damaged if pushed through.

In another advantageous feature of the detector drawer receptacle, the stop includes a sliding stop, which is actuatable by the stop actuator in a thrust position that is dependent on a direction of insertion of the detector drawer. Because of the variable stop position, an appropriate configuration may cause a detector drawer with a stop actuator to come to a stop at substantially the same position relative to the receptacle, regardless of the insertion direction, without the stop actuator having to have an accordingly configured mechanism. Without the advantageous sliding stop, the stop position of the drawer may differ, at least by the geometric measurements of the stop actuator, depending on the insertion direction.

In a further advantageous feature of the detector drawer receptacle, the sliding stop is supported displaceably in the thrust direction of the detector drawer receptacle. Displaceable support is a simple mechanical way of realizing a sliding stop with different stop positions.

Illustrative and exemplary embodiments of the invention are described in further detail below with reference to and in conjunction with the figures.

BRIEF DESCRIPTION OF THE DRAWINGS

FIG. 6 is a perspective view of a schematic of an X-ray system.

DETAILED DESCRIPTION OF DRAWINGS

Figure 1:
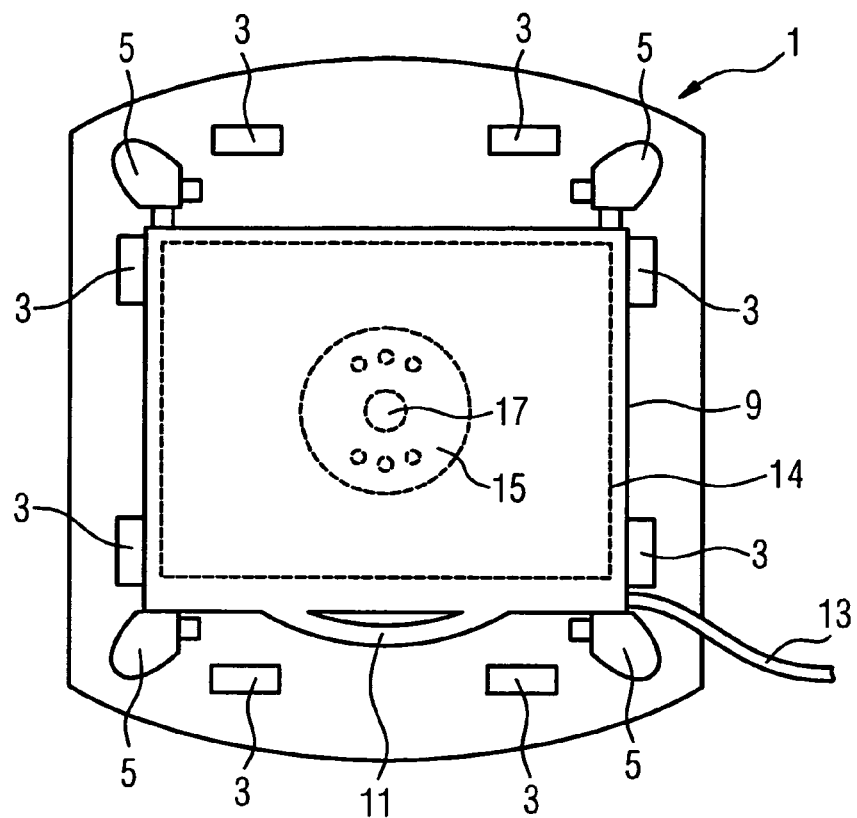
FIG. 1 is a schematic plan view of a detector drawer with an X-ray detector in place.

In FIG. 1, a detector drawer 1 is shown schematically in a plan view. In the insertion direction, the detector drawer 1 has two parallel, rectilinear edges. Handles, for instance, for pushing in and pulling out, may be provided on the other two opposite, curved edges, but these handles are not shown in the drawing.

The detector drawer 1 has guides 3, 5, which serve to guide an X-ray detector during insertion into the detector drawer 1. For example, a substantially rectangular X-ray detector could be guided between two opposed guides 3, 5 in such a way that lateral slipping is prevented and a longitudinal motion upon insertion is enabled. Individual guides 3, 5 are also provided in all four corners of the detector drawer 1. An X-ray detector 9 is placed in the detector drawer 1.

The X-ray detector 9 placed in the detector drawer 1 is a portable digital X-ray detector. The portable detector has a handle 11, which can be grasp and/or carried. The portable x-ray detector also has an electrical cable 13, through which power supply and signal transmission lines extend. The cable 13, shown at bottom right in the drawing, can become damaged, sheared off or exposed to tensile stresses when the detector drawer 1 is inserted into a receptacle, not shown in this drawing. Care will therefore be taken to assure that the cable 13 is positioned on the side of the detector drawer 1 away from the receptacle, as shown in FIG. 1. Further, the receptacle may accordingly have to be disposed at the top and the detector drawer 1 may have to be inserted into it in the direction of the receptacle, that is, upward.

Figure 2:
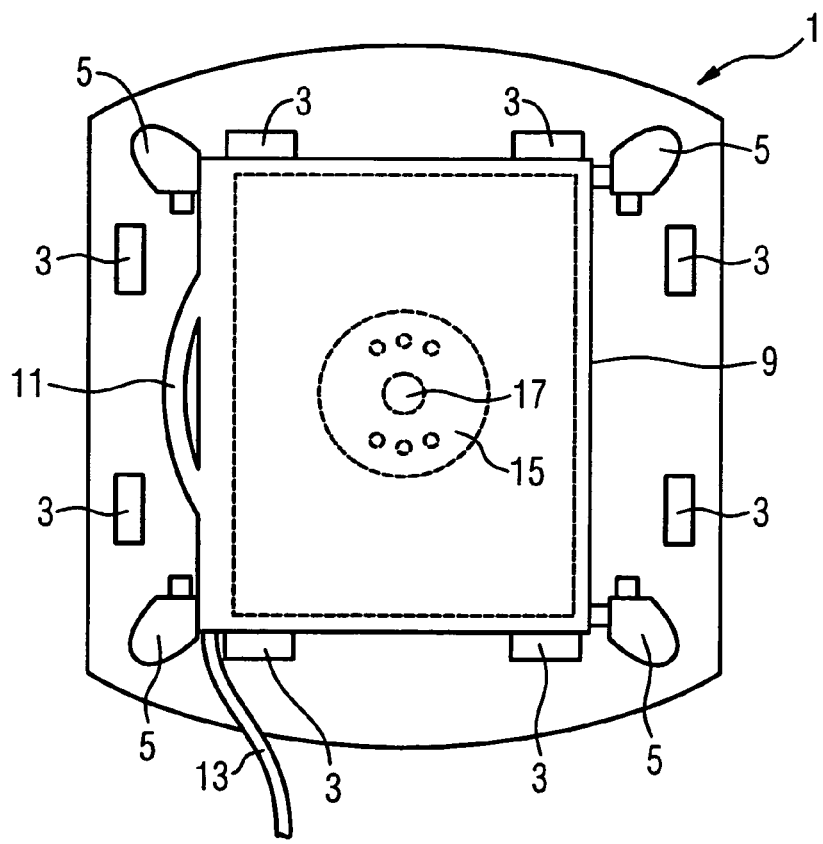
FIG. 2 is a schematic plan view of the detector drawer of FIG. 1 with an X-ray detector inserted with a different orientation.

A stop actuator 15, to be described in further detail hereinafter, along with a slide 17 are shown in dot-dashed lines. In FIG. 2, the same detector drawer 1 as in the previous drawing is also shown in plan view, using the same reference numerals. However, the X-ray detector 9 is now inserted with an orientation rotated 90° clockwise. Because of the rotated orientation of the X-ray detector 9, a different format for X-ray images can be obtained. Instead of the upright format (portrait orientation) shown in the preceding drawing, the detector, as a result of the rotation, is now oriented for taking a picture of crosswise format (landscape orientation).

Along with a rotation of the X-ray detector 9, the position of the electrical cable 13 also rotates, toward the bottom left in the drawing. If the detector drawer 1, as described above, is inserted upward in the drawing into a receptacle, then the risk of damaging or shearing off or tensile stress on the cable may be minimized because of the position of the cable 13 at the bottom left.

Figure 3:
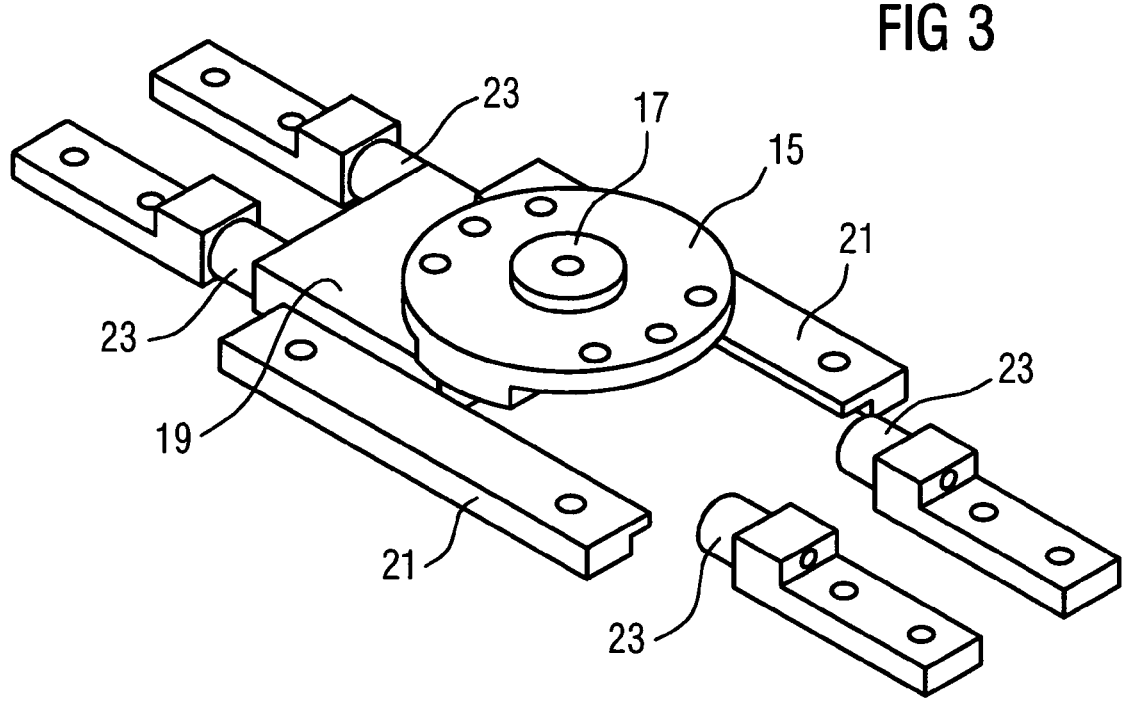
FIG. 3 is a perspective view of a stop actuator for a detector drawer.

In FIG. 3, a stop actuator 15 is shown along with a sliding stop 19 for minimizing or limiting the potential insertion travel of the detector drawer 1 in the receptacle. The construction shown may serve to minimize a pushing of the detector drawer 1 all the way through the receptacle open on both sides if an X-ray detector has been placed therein. Otherwise, if the receptacle is pushed through with a digital X-ray detector placed therein, there may potentially be the risk that its electrical cable may be exposed to unwanted damage, tensile stress or shear force.

The stop actuator 15 includes a slide 17 which can slide up and down on a shaft (not shown). A spring, also not shown in the drawing, keeps the slide 17 in the upper end position on the shaft. The shaft is solidly connected to the detector drawer 1, not shown in this drawing for the sake of simplicity. In the receptacle, also not shown for the sake of simplicity, for the detector drawer 1, there is a sliding stop 19, against which the stop actuator 15 can come to a stop.

Inserting a detector into the detector drawer, not shown, presses the slide 17 downward counter to the force of the spring. As such, the slide 17 may be put at a suitable height to come into contact with the sliding stop 19. If the detector drawer 1 is then inserted into the receptacle, the slide 17 runs up against the sliding stop 19.

The sliding stop 19 is guided longitudinally displaceably in guide rails 21. If or once engaged by the slide 17, the sliding stop 19 can be displaced far enough so as to strike the stoppers 23. Accordingly, no further displacement in the same direction may be allowed. Thus, the stoppers 23, together with the sliding stop 19, may bring about a stop position which may substantially minimize or limit the motion of the slide 17 and hence of the detector drawer. The guide rails 21 are oriented in the thrust direction of the detector drawer 1, so that the construction may create a stop in the thrust direction.

When the detector 9 is not in place, the slide 17 is—as described above—pressed by a spring into its uppermost position, so as to enter into engagement with the sliding stop 19. As such, when the detector 9 is not in place, the detector drawer 1 can be pushed through the receptacle, past the sliding stop 19. If a detector 9 is then placed in the detector drawer 1 on the other side of the receptacle, then the slide 17 is pressed downward on this other side of the sliding stop 19. When the detector drawer 1 is then inserted into the receptacle, the slide 17 runs from that side up against the sliding stop 19 and pushes it against the opposed stoppers 23. Thus a stop position in the insertion direction is predetermined for both directions of motion of the detector drawer.

A length of the sliding stop 19, a thrust distance and dimensions of the slide 17 may be made such that a stop is created substantially exactly in the middle of the receptacle for the detector drawer 1, regardless of the insertion direction. One can therefore be substantially assured that a detector 9 placed in the detector drawer 1 is be positioned substantially centrally in the receptacle.

In contrast to a rigid stop, instead of the sliding stop 19, and given suitable dimensioning of the aforementioned dimensions, a stop position of the detector drawer 1 is predetermined independently of the particular direction of insertion, which position is generally located at substantially the same position relative to the receptacle. Conversely, if there is a rigid stop instead of the sliding stop 19, the result may be a stop position of the detector drawer 1 which may differ depending on the insertion direction, at least by the dimensions of the slide 17.

Figure 4:
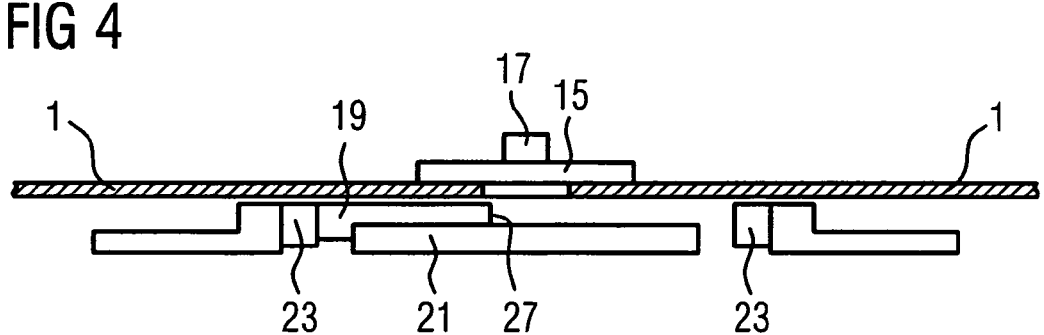
FIG. 4 is a side view of the stop actuator illustrated in FIG. 3 without a detector.

In FIG. 4, the sliding stop 19 described above is shown in a side view together with the stop actuator 15. The stop actuator 15—as explained above—has a slide 17, supported on a shaft (not shown), and the slide 17 is pressed into the uppermost position by the force of a spring (not shown). The stop actuator 15 is connected to the detector drawer 1. As long as no detector is in place, the slide 17 is located above the sliding stop 19 and can be displaced in both directions, to the right and left in terms of the drawing, past the sliding stop 19.

Figure 5:
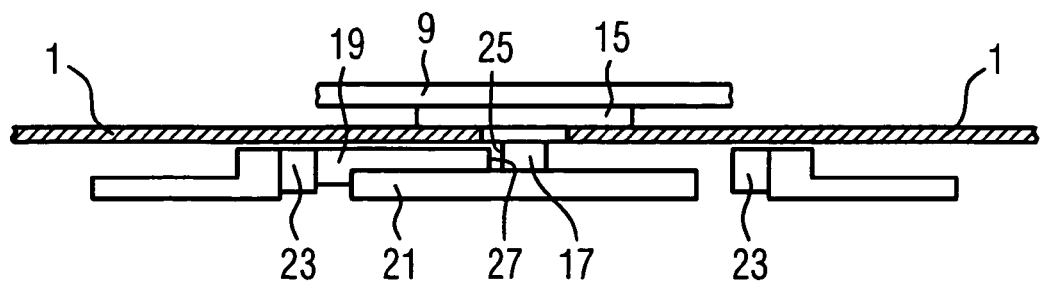
FIG. 5 is a side view of the stop actuator illustrated in FIG. 3 with a detector.

As such, when the detector 9 is not in place, the detector drawer 1 can be pushed through the receptacle without the stop actuator 15 becoming operative. The sliding stop 19 is guided in guide rails 21 in such a way that its mobility in the thrust direction, that is, to the right and the left in the drawing, may be restricted by the stoppers 23. In FIG. 5, the stop actuator 15 is shown in a side view together with the sliding stop 19 and the detector drawer 1, as in the previous drawing, but with the stop actuator 15 in the actuation position. In contrast to the position of repose of the stop actuator 15 shown in FIG. 4, in which the slide 17 is pressed into its uppermost position, the slide 17 is now, in the actuation position, pushed downward by the X-ray detector 9, now placed in the drawer 1. The detector 9 accordingly presses the slide 17—downward counter to the force of the spring. As such, a stop face 25 of the slide 17 is lowered to a level so as to enter into engagement with the sliding stop 19 by contacting an edge 27 thereof.

Therefore, upon insertion of the detector drawer 1 into the receptacle, the slide 17, in its actuation position, engages the sliding stop 19 with its stop face 25 and carries the sliding stop 19 along with it upon further insertion of the detector drawer 1 in the insertion direction until the sliding stop 19 strikes the stopper 23. Thus, both the stopper 23 and the sliding stop 19 may define the stop position up to which the detector drawer 1 can be inserted into the receptacle.

From FIGS. 4 and 5 described above, the detector drawer 1 with the stop actuator 15 in the position of repose can be pushed through the receptacle past the sliding stop 19. Pushing the detector drawer 1 through, that is, to the left in the above cited drawings, may cause the stop actuator 15 to come to rest on the other side of the sliding stop 19. If a detector 9 were placed in the detector drawer 1 there and the detector drawer 1 were inserted into the receptacle, then the stop actuator 15, in its actuation position, may engage the sliding stop 19 arriving from the left, in terms of the drawings, and push it against the stopper 23 shown on the right in the drawings. Upon insertion from this direction, the stopper 23 shown on the right may thus, together with the sliding stop 19, define the stop position of the detector drawer 1 in the receptacle.

The above-described FIGS. 3 through 5 thus describe one mode of operation of the stop actuator 15 in the position of repose and in the actuation position. The end position of the detector drawer 1 upon coming to a stop in the receptacle is defined by the movable sliding stop 19. Alternatively, the stop 19 may instead be embodied as a rigid stop instead of as a sliding stop. As such, the stop actuator 15 may instead be supported displaceably in the thrust direction of the detector drawer 1, in order to achieve substantially a similar effect obtained by the displaceability of the sliding stop 19.

In FIG. 6, an X-ray system 39 or so-called Bucky system is shown schematically. An X-ray source 35 may be secured to a ceiling mount 33. The X-ray source 35 serves to generate an X-ray beam, which in the drawing extends with a downward orientation. Below the X-ray source 35 is a patient examination table 29, on which a patient to be examined could for instance be positioned or located. The patient examination table 29 has a receptacle 31, into which a detector drawer 39 can be inserted. If an X-ray detector is located in the detector drawer, then the X-radiation generated by the X-ray source 35 can pass through the patient located above the receptacle 31, and the X-radiation can then be detected by the X-ray detector located in the receptacle.

Although not visible from the drawing, the receptacle 31 is open on two opposite sides, so that a detector drawer can be inserted from both opposite sides. The detector drawer and the receptacle 31 may—as described above—have a sliding stop, which substantially hinders the detector drawer from being thrust all the way through the receptacle 31 if an X-ray detector is in place therein. As such, the detector drawer—as described above—has a stop actuator, while a correspondingly guided sliding stop together with stoppers is accommodated in the receptacle 31. Further, the above-described detector drawer can be used with a portable digital X-ray detector in such a way that the X-ray detector, regardless of the insertion direction, substantially comes to a stop centrally in the receptacle 31, such that the detector drawer may not be thrust all the way through the receptacle 31 in a way that is unwanted on account of the detector cable.

The invention claimed is:

1. A detector drawer, comprising:
   a drawer adapted to accept insertion of an X-ray detector, the drawer being configured to be insertable into one of two open sides of a detector drawer receptacle; and
   a stop actuator configured to actuate a stop of the detector drawer receptacle when a X-ray detector is inserted into the drawer, and the drawer is inserted into the detector drawer receptacle.

2. The detector drawer of claim 1, wherein the stop actuator has a slide which is configured to be displaced in one direction as a function of the insertion of the X-ray detector and in an opposite direction as a function of the removal of the X-ray detector.

3. The detector drawer of claim 2, wherein the stop actuator further includes a spring element by whose spring force the slide is displaceable as a function of a removal of the X-ray detector.

4. The detector drawer of claim 1, wherein the stop actuator further includes a first stop face which, as a function of an insertion of the detector drawer, strikes a second stop face of the stop of the detector drawer receptacle.

5. The detector drawer of claim 2, wherein the stop actuator further includes a first stop face which, as a function of an insertion of the detector drawer, strikes a second stop face of the stop of the detector drawer receptacle.

6. The detector drawer of claim 3, wherein the stop actuator further includes a first stop face which, as a function of an insertion of the detector drawer, strikes a second stop face of the stop of the detector drawer receptacle.

7. In an X-ray detector drawer receptacle which is open on two sides and through which a detector drawer is insertable from either of the two sides, an improvement in the detector drawer receptacle comprising:
   a stop which is actuatable by a stop actuator of the detector drawer as a function of an insertion of the detector drawer.

8. The detector drawer receptacle of claim 7, wherein the stop includes a sliding stop which is actuatable by the stop actuator in a thrust position that is dependent on a direction of insertion of the detector drawer.

9. The detector drawer receptacle of claim 8, wherein the sliding stop is supported displaceably in the thrust direction of the detector drawer receptacle.

10. The detector drawer receptacle of claim 9, wherein the displaceability of the sliding stop is minimized in thrust directions from both open sides of the receptacle by a respective stopper.

11. In a patient examination table having an x-ray detector drawer receptacle, the detector drawer receptacle open on two sides and through which a detector drawer is insertable from either of the two sides, an improvement in the detector drawer receptacle comprising:
    a stop which is actuatable by a stop actuator of the detector drawer as a function of an insertion of the detector drawer.

12. The patient examination table of claim 11, wherein the stop includes a sliding stop which is actuatable by the stop actuator in a thrust position that is dependent on a direction of insertion of the detector drawer.

13. The patient examination table of claim 11, wherein the sliding stop is supported displaceably in the thrust direction of the detector drawer receptacle.

14. The patient examination table of claim 11, wherein the displaceability of the sliding stop is minimized in thrust directions from both open sides of the receptacle by a respective stopper.

15. In an X-ray system having a patient examination table, the patient examination table, having a detector drawer receptacle, the detector drawer receptacle open on two sides and through which a detector drawer is insertable from either of the two sides, an improvement in the detector drawer receptacle comprising:
    a stop which is actuatable by a stop actuator of the detector drawer as a function of an insertion of the detector drawer.

16. The X-ray system of claim 15, wherein the stop includes a sliding stop, which is actuatable by the stop actuator in a thrust position that is dependent on a direction of insertion of the detector drawer.

17. The X-ray system of claim 15, wherein the sliding stop is supported displaceably in the thrust direction of the detector drawer receptacle.

18. The X-ray system of claim 15, wherein the displaceability of the sliding stop is minimized in thrust directions from both open sides of the receptacle by a respective stopper.

* * * * *